May 12, 1970 R. A. HERZOG 3,510,909
AUTOMATIC UNSHACKLER
Filed Nov. 16, 1967 2 Sheets-Sheet 1

INVENTOR
RAYMOND A. HERZOG
BY J. Warren Kinney Jr.
ATTORNEY

May 12, 1970 — R. A. HERZOG — 3,510,909
AUTOMATIC UNSHACKLER
Filed Nov. 16, 1967 — 2 Sheets-Sheet 2
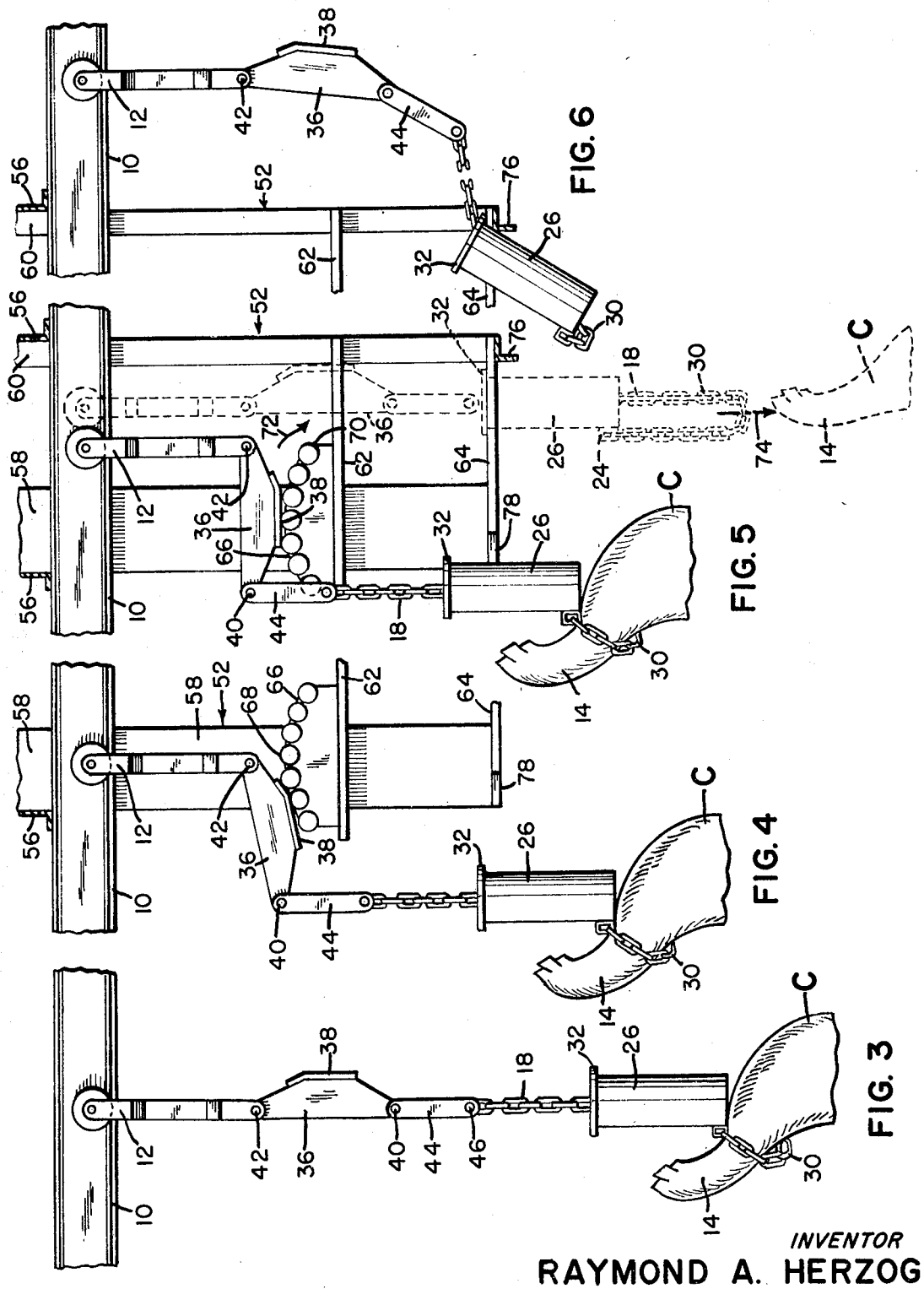
INVENTOR
RAYMOND A. HERZOG
BY J. Warren Kinney, Jr.
ATTORNEY 3,510,909
AUTOMATIC UNSHACKLER
Raymond A. Herzog, Cincinnati, Ohio, assignor to Cincinnati Butcher's Supply Company, Cincinnati, Ohio, a corporation of Ohio
Filed Nov. 16, 1967, Ser. No. 683,716
Int. Cl. A22b 5/00
U.S. Cl. 17—24                                16 Claims

ABSTRACT OF THE DISCLOSURE

An overhead conveyor is provided with spaced trolleys advanced by a drive chain, said trolleys each carrying an animal shackle of the self-tightening loop or noose type which may release the animal by relaxing and enlarging the loop or noose. The release or unshackling of the animal is performed within a rigid stationary frame, with the use of means for automatically enlarging the loop or noose, said means within the frame having no moving parts and no power means additional to the drive for advancing the trolleys.

---

The present invention relates to an automatic unshackler, or apparatus to automatically release from a shackle an object suspended thereby.

Shackles are commonly used in slaughterhouses and meat processing plants, for suspending animals by a rear leg from an overhead moving conveyor, while the animal undergoes a succession of operations or treatments resulting finally in the production of commercial meat. At certain stages of processing, it is considered desirable or necessary to release the animal or carcass from the advancing influence of the overhead conveyor. Such release preferably is to be effected by deactivating or relaxing the leg shackle while the overhead conveyor continues to advance, without bodily disassociating the shackle from the conveyor.

The shackle with which the present invention is concerned, is that type of shackle which comprises a flexible suspender, usually in the form of a length of chain, arranged as a noose or snare about a rear leg or extremity of the animal, so that the weight of the animal, suspended, serves constantly to tighten the shackle about the leg encircled thereby. This type of shackle may be caused to release its hold upon the animal leg, by relieving and enlarging the noose portion of the shackle so that the leg may slip from said noose portion, thereby to drop the animal.

An object of the present invention is to provide improved means operative automatically to deactivate a shackle of the type referred to, for release of a body suspended by the shackle.

Another object of the invention is to deactivate a shackle of the type referred to, while said shackle suspends a body from an advancing overhead conveyor, the deactivation being accomplished without resort to power-actuated means supplementary to said advancing overhead conveyor movement.

A further object of the invention is to simplify and reduce the cost of manufacture, installation, and maintenance of an automatic unshackler of the type referred to.

Another object is to enhance the efficiency, durability, and dependability of an automatic device for dropping an animal carcass from a moving overhead conveyor.

The foregoing and other objects are attained by the means described herein and illustrated upon the accompanying drawings, in which:

FIGS. 3, 4, 5 and 6 are cross-sections taken vertically through the web of the trolley rail of FIGS. 1 and 2, showing a progression of operating stages characterizing the unshackling mechanism of the present invention.

Figures 1, 2:
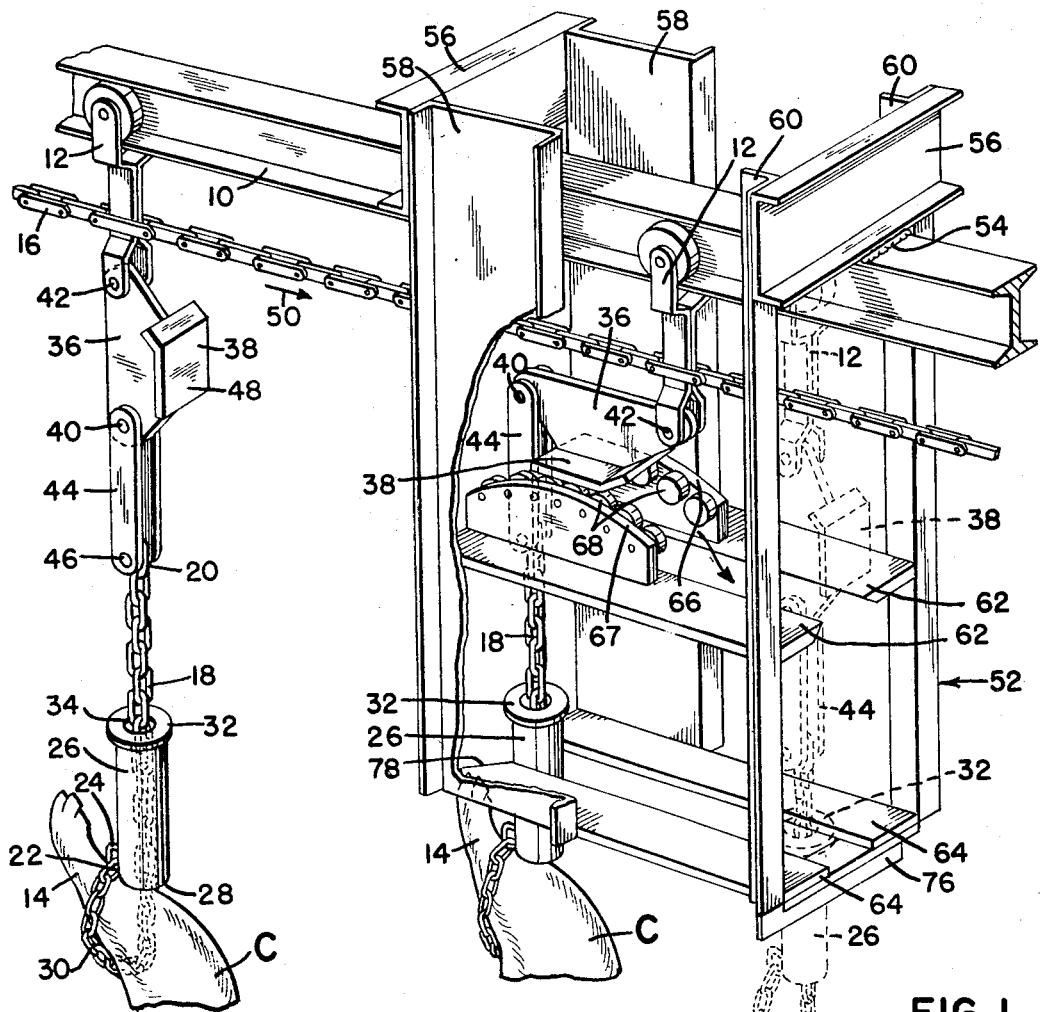
FIG. 1 is a perspective view of an overhead conveyor construction in which is embodied a trolley-supported shackle, and the improved automatic unshackler of the invention.
FIG. 2 is a vertical cross-section taken through the trolley which supports the shackle of FIG. 1.

The device of this invention constitutes an improvement upon the device disclosed in the issued U.S. patent of E. A. Kopp, No. 3,111,706, dated Nov. 26, 1963.

In the drawings, the reference numeral 10 indicates an overhead track or rail adapted to support a succession of wheeled trolleys 12 whereby carcasses or animals C may be suspended and conveyed through a slaughterhouse or packing plant in the course of processing. The suspended animal may be for example a hog, a rear leg or extremity 14 of which is shown shackled. The trolleys 12 may be spaced from one another and advanced in one direction along rail 10, as by means of a drive chain or flexible member 16 which may be motor-driven in substantial parallelism with the rail. An infinite number of trolleys may be suspended by rail 10, and may be spaced apart by the links of drive member 16 as shown.

It may here be noted that drive member 16 may be omitted, if the trolleys are to advance successively along rail 10 by gravity or other force of propulsion.

The shackle for suspending carcasses C, may comprise an elongate flexible suspender or non-rigid member 18, preferably in the form of a chain as shown, having opposite ends 20 and 22. End 22 may be fastened to an eye 24 or other anchorage means located preferably near one open end 28 of an elongate hollow sleeve or tubular member 26. The intermediate portion of chain 18 extends through sleeve 26, to form a depending noose or loop 30 in which the animal leg 14 may be accommodated and gripped.

From the foregoing, it will be understood that the size of loop or noose 30 may be varied, by movement of sleeve 26 along the intermediate portion of chain or flexible member 18. By this means, the loop may be applied to an animal leg while the chain is slackened. As the chain is drawn taut, the loop will close about the leg and grip it with great force. The tubular member or sleeve 26 may be formed of a strong and rigid material such as metal.

Sleeve 26 may carry a fixed lateral projection or abutment 32, disclosed herein as an annular flange of a diameter greater than the outside diameter of the sleeve, and located at or near the upper open end 34 of the sleeve. The flange or abutment 32, which may also be referred to as an engaging member, can be formed as an integral part of the sleeve if desired, or it may be a separate part securely mounted upon the sleeve. By preference, though not of necessity, the engaging member or abutment 32 is circular in form. Chain 18 may pass freely through sleeve 26.

The uppermost or free end 20 of chain 18 has connection with one end of an elongate lifter element 36, which may comprise a substantially flat metallic plate carrying a rigid shoe 38 arranged substantially at right angles to the plane of said plate. At opposite ends of the lifter element 36 are located the pivots 40 and 42. Pivot 40 has connection with chain end 20 preferably through the agency of an elongate link, or link pair 44. One end of link 44 may have pivotal connection with the lower end of lifter element 36 at 40, while the opposite end at 46 suspends the end 20 of chain 18. Pivot 42 connects the lifter element to the lower end of trolley 12.

It will be noted that in the normal position of suspension illustrated at the left end of FIG. 1, a line passing through the pivots 40 and 42 of lifter element 36 is substantially vertical, and the planar face 48 of shoe 38 is substantially parallel to said vertical line, but offset therefrom in the direction of advancement of trolley 12. Thus, the face of shoe 38 advances ahead of the trolley 12 and chain 18, as the conveyor chain 16 moves steadily in the direction of arrow 50.

With the conveyor chain 16 advancing in the direction of arrow 50, the carcass extremity 14 will be securely gripped by chain loop 30 which suspends the whole weight of the carcass. The lower end 28 of sleeve 26 will rest against the carcass, while at the same time serving to contract the loop thereabout, with a force dependent largely upon the weight of the carcass.

It should readily be understood that a force applied upwardly upon sleeve 26 to lift it relative to pivot or anchorage 46, in FIG. 1, would have the effect of enlarging the loop 30 and allowing leg 14 to slip out of the loop, thereby to effect a release and dropping of the carcass from the conveying apparatus. Wherever such release of the carcass is to be effected, the automatic unshackler of the present invention may be installed along the trolley rail.

The automatic unshackler may include a rigid frame 52 welded or otherwise secured as at 54 upon rail 10. The frame may comprise headers 56, 56 astride the rail, and arranged to suspend depending pairs of channel members 58, 58, and pairs of angle members 60, 60 which extend beneath the level of rail 10. The members 58, 58 are spaced apart, as are also the members 60, 60 to permit a trolley 12 and its dependages to be drawn through frame 52 by continuous advancement of conveyor chain 16.

At a proper elevation upon frame 52 may be fixed a pair of spaced guide members 62, 62, between which the trolley and shackle assembly may advance. The frame may support also a second pair of guide members 64, 64 at an elevation beneath members 62, 62. Members 64, 64 are rigidly and fixedly spaced apart a distance exceeding the diameter of sleeve 26, but less than the diameter or lateral spread of the sleeve flange or engaging member 32. Accordingly, the flange or engaging member 32 may at times rest upon guide or support members 64, 64, as depicted by broken lines in FIGS. 1 and 5.

Means is provided for momentarily elevating the shackle and the carcass suspended thereby, while undergoing advancement by drive chain 16, to condition the shackle for release of the carcass. Such elevating means may comprise an elongate track, made preferably in two spaced sections 66 and 67, to be traversed by the face of shoe 38 as conveyor chain 16 advances the shoe to the right in FIG. 1. Frictional drag of the shoe upon the track sections may be reduced by means of rollers 68, if necessary, the rollers being rotatably mounted upon the track sections without obstructing the space between guide members 62, 62.

As best illustrated upon FIGS. 3 through 6, the level of track 66, 67 with respect to that of lifter element 36, is such that advancement of a trolley toward the right causes shoe 38 to strike and then climb onto the track (FIG. 4), resulting in a tilting of lifter element 36 toward a horizontal position. Such tilting of the lifter element elevates its pivot end 40, and consequently the carcass C and its supporting shackle. Displaced to its lifted position, the flange or engaging member 32 of sleeve 26 will rise above the level of support members 64, 64 (FIGS. 4 and 5), and continued advancement of the trolley will advance the lifter element 36 and sleeve 26 into frame 52.

As trolley 12 continues to advance, the lifter element 36 completes its traverse of track 66, 67, and leaves the terminal end 70 of the track. Having lost the support of the track, lifter element 36 follows the course of arrow 72 in dropping to the upright position illustrated by broken lines in FIG. 5.

In dropping to the broken line position of FIG. 5, the flange or engaging member 32 is stopped against support member 64, 64, causing chain 18 to drop through sleeve 26 to enlarge the chain loop or noose 30 beneath the sleeve and thereby unshackle and release the leg of carcass C as suggested by arrow 74.

The shackle after release of the carcass, continues its advancement with trolley 12 so as to leave the confines of frame 52. If the frame carries a reinforcing cross-bar such such as 76, the sleeve 26 will be dragged across the top of the cross-bar incident to advancement of the trolley by conveyor chain 16, in leaving the confines of the frame. Cross-bar 76 may of course be omitted in constructing the frame.

As will readily be understood, the support members 64, 64 should be carried by frame 52 at an elevation sufficiently above the normal level of travel of sleeve 26, to induce ample enlargement of loop 30 for dropping the carcass. The normal level of travel of sleeve 26 is depicted by FIG. 3, and is seen to be below the level of members 64 in FIG. 5. Lifter element 36 is required to lift the sleeve from the level of FIG. 3 to a level above that of support members 64. When the lifter element drops to the broken line position of FIG. 5, the effect is to decrease the distance between the sleeve 26 and trolley connector 42, for enlarging loop 30 and releasing the carcass.

The reference character 78 indicates a flare or throat for guiding the advancing shackle and sleeve into the space between support members 64, 64.

From the foregoing explanation, it is clearly apparent that the unshackling mechanism of the present invention is entirely automatic in its operation, and incorporates no operating parts required maintenance attention, adjustments, or frequent parts replacements or repairs. The unshackling mechanism moreover requires no separate expensive power means for its operation, and it eliminates entirely the need for electric circuits, switches, relays, solenoids, valves, and other accessories which in failing to function might necessitate costly plant shut-downs. To be noted also is the minimum headroom required above rail 10 for installation of the apparatus.

In the present embodiment, the track 66, 67 is shown upwardly arched above the support members 62, 62; however, such arching of the track, while desirable, is not an absolute necessity. The track might instead be straight, and possibly inclined upwardly in the direction of advancement of the trolley. Anti-friction means other than the rollers 68 might be incorporated in the track, if desired, or as an alternative, any acceptable known means may be employed for minimizing friction between the track and the lifter element. Such means may consist merely of a good lubricant.

The flexible or non-rigid suspender 18, while herein disclosed as a chain, might be in the form of a cable or rope, although the chain type of suspender is preferred. As will be understood, a shackle upon releasing a carcass and leaving the unshackler frame 52, may be carried by the moving conveyor to a station at which shackling to another animal or carcass is performed. Shackling is easily accomplished by dropping the chain 18 through sleeve 26 to produce a loop of proper size to accommodate an animal extremity. Since the loop forms with the sleeve a noose which is self-tightening, shackling may be effected with ease and dispatch.

It is to be understood that various modifications and changes may be made in the structural details of the device without departing from the spirit of the invention.

What is claimed is:

1. Apparatus for conveying an animal from one location to a second location, and comprising in combination: a conveyor comprising an elongate overhead rail, and a multiplicity of wheeled trolleys advanceable along the length of said rail in succession; a shackle including an elongate sleeve having an engaging portion of the exterior thereof, and an elongate non-rigid member having a lower end and an upper end; means connecting the lower end of said non-rigid member to said sleeve, with said non-rigid member slidable upwardly through the sleeve to form a depending loop to receive and grip an extremity of the animal for suspending the animal from said loop; connecting means connecting the upper end of said non-rigid member to one trolley; and abutment means cooperatively engageable with a portion of said non-rigid member upon advancement of said one trolley along the rail, to decrease the distance between said connecting means and said sleeve, to permit the loop to increase in size and release said animal extremity for dropping the animal.

2. Apparatus as specified by claim 1, wherein the combination includes power actuated means for advancing said one trolley along the rail.

3. Apparatus for conveying an animal from one location to a second location, and comprising in combination: a conveyor comprising an elongate overhead rail, and a multiplicity of wheeled trolleys; a conveyor drive means for advancing said trolleys in one direction along the length of said rail; a shackle including an elongate sleeve having an engaging portion on the exterior thereof, and elongate non-rigid member having a lower end and an upper end; means connecting the lower end of said non-rigid member slidable upwardly through the sleeve to form a depending slip-loop to receive and grip an extremity of the animal for suspending the animal from said loop; connecting means connecting the upper end of said non-rigid member to one of the trolleys; and an elevating means powered by said one advancing trolley, for first bodily elevating the shackle including the sleeve and the non-rigid member, and the animal suspended thereby, and then lowering the non-rigid member through the sleeve while the sleeve is momentarily held in restraint against lowering, to enforce enlargement of the loop for release of the animal extremity therefrom, said elevating means comprising an abutment means cooperatively engageable with a portion of said non-rigid member and being the sole means for elevating said shackle.

4. Apparatus as specified by claim 3, wherein said elevating means in its entirety is located wholly beneath the level of the overhead rail.

5. Apparatus as specified by claim 3, wherein said elevating means in part is carried by and advanceable with said wheeled trolley along the trolley rail.

6. Apparatus as specified by claim 3, wherein said elevating means comprises an elongate lifter element having opposite ends pivoted respectively to the trolley and to the connecting means for the upper end of the non-rigid member, said lifter element normally being suspended substantially vertically from the trolley, and track means in the path of movement of said lifter element in the direction of trolley advancement, for intercepting said lifter element and momentarily tilting same to approximtae horizontal position while the trolley remains at a constant level relative to the overhead rail.

7. Apparatus as specified by claim 6, wherein the combination includes a stationary frame fixed relative to the trolley rail, and upon which frame the track means is fixedly mounted for intercepting and tilting said lifter element, and a support means on the frame for momentarily intercepting the engaging portion of the sleeve, to restrain the sleeve momentarily against movement to a fully lowered position along the non-rigid member.

8. Apparatus as specified by claim 3, wherein the drive means for the conveyor advances the trolleys continuously.

9. Apparatus as specified by claim 7, wherein the drive means for the conveyor operates continuously for advancing the trolleys.

10. In combination, a conveyor comprising an elongate overhead rail, and a multiplicity of wheeled trolleys; conveyor drive means for advancing said trolleys in one direction along the length of said rail; a shackle including an elongate sleeve and an elongate non-rigid member having a lower end and an upper end; means connecting the lower end of said non-rigid member to said sleeve, with said non-rigid member slidable upwardly through the sleeve to form a depending slip-loop to receive and grip an extremity of an animal in suspension from said loop; an elongate lifter element having opposite ends; means pivoting one lifter element end upon a trolley, and means attaching the upper end of the non-rigid member to the remaining end of the lifter element; a shoe on the lifter element having a face in substantial parallelism with a line passing through the opposite ends of the lifter element; a frame fixed relative to and pendant beneath the overhead rail; a track supported upon the frame in position to intercept the shoe during advancement of a trolley suspending said lifter element and shoe, with the shoe riding upon the track in substantial correspondency with advancement of the trolley along the rail, to tilt the lifter element for bodily raising said remaining end thereof, the non-rigid member attached thereto, and the sleeve; said track having a terminal end from which the shoe may drop, with consequent gravitation of the sleeve toward a lower limit of travel; a support means on the frame to interrupt gravitation of the sleeve incident to dropping of the shoe from the terminal end of the track, thereby to lower the non-rigid member through the sleeve with resultant enlargement of the slip-loop for release of the animal extremity, said sleeve being displaceable from said support means by the advancing movement of the trolley suspending said sleeve.

11. The combination as specified by claim 10, wherein the track and the support means each comprises two spaced parts flanking the shackle as the shackle is advanced by a trolley thereto attached.

12. The combination as specified by claim 10, wherein the lifter element, the track traversed thereby, and the support means for interrupting gravitation of the sleeve, are located below the level of the overhead rail.

13. The combination as specified by claim 12, wherein the track and the support means are divided to flank the shackle as the shackle is advanced by a trolley thereto attached.

14. The combination as specified by claim 10, wherein the track and the support means each comprises two spaced parts flanking the shackle as the shackle is advanced by a trolley thereto attached, and the sleeve carries a fixed outwardly extended flange to span the two spaced parts of the support means in interrupting gravitation of the sleeve.

15. The combination as specified by claim 14, wherein the lifter element, the track traversed thereby, and the support means interrupting gravitation of the sleeve, are located below the level of the overhead rail.

16. The combination as specified by claim 10, wherein the track traversed by the shoe of the lifter element carries anti-friction means enhancing travel of the shoe along the track to the terminal end thereof.

References Cited

UNITED STATES PATENTS

| | | |
|---|---|---|
| 976,316 | 11/1910 | Thomson. |
| 2,052,749 | 9/1936 | Brewster _____ 17—24 |
| 2,652,589 | 9/1953 | Spooner _____ 17—24 |
| 2,846,721 | 8/1958 | Schonwise _____ 17—24 |
| 3,111,706 | 11/1963 | Kopp _____ 17—24 |

LUCIE H. LAUDENSLAGER, Primary Examiner